(12) United States Patent
Fujita et al.

(10) Patent No.: US 8,278,577 B2
(45) Date of Patent: *Oct. 2, 2012

(54) SWITCH

(75) Inventors: Daisuke Fujita, Tokyo (JP); Hitoshi Sadakuni, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 326 days.

This patent is subject to a terminal disclaimer.

(21) Appl. No.: 12/741,402

(22) PCT Filed: Nov. 6, 2007

(86) PCT No.: PCT/JP2007/071561
§ 371 (c)(1),
(2), (4) Date: May 5, 2010

(87) PCT Pub. No.: WO2009/060513
PCT Pub. Date: May 14, 2009

(65) Prior Publication Data
US 2010/0243415 A1    Sep. 30, 2010

(51) Int. Cl.
H01H 1/00    (2006.01)
H01H 9/00    (2006.01)
(52) U.S. Cl. .................................. 200/273; 200/254
(58) Field of Classification Search ................. 200/273, 200/554, 254
See application file for complete search history.

(56) References Cited

U.S. PATENT DOCUMENTS

| | | |
|---|---|---|
| 4,357,508 A | 11/1982 | Werner |
| 4,414,451 A | 11/1983 | Bleidt et al. |
| 4,467,161 A | 8/1984 | Fox et al. |
| 4,678,876 A | 7/1987 | Westbrock et al. |
| 5,566,818 A | 10/1996 | Kuboyama et al. |
| 6,865,072 B2 | 3/2005 | Sato et al. |
| 2002/0051336 A1 | 5/2002 | Shichida et al. |
| 2004/0104201 A1 | 6/2004 | Sato et al. |
| 2010/0213045 A1 | 8/2010 | Fujita et al. |

FOREIGN PATENT DOCUMENTS

| | | |
|---|---|---|
| EP | 1 202 417 | 5/2002 |
| FR | 2 846 802 | 5/2004 |
| JP | 07-15162 Y1 | 11/1932 |

(Continued)

OTHER PUBLICATIONS

European Search Report dated Oct. 12, 2010, issued in the corresponding European Application No. 10163565.4-2214.

(Continued)

*Primary Examiner* — Renee Luebke
*Assistant Examiner* — Lheiren Mae Caroc
(74) *Attorney, Agent, or Firm* — Buchanan Ingersoll & Rooney PC

(57) ABSTRACT

A switch includes a blade-type moving contact that extends in a radial direction from a turning center and reciprocates such that its free end draws a turning locus, and a fixed contact that moves toward and away from the moving contact in a turning range of the moving contact. The blade-type moving contact and the fixed contact are accommodate in a tank. The moving contact is supported by the movable-side support conductor. The fixed contact is supported by the fixed-side support conductor. An opening through which the moving contact enters is arranged to be opposed to a turning center of the moving contact. The movable-side support conductor and the fixed-side support conductor are arranged substantially on a same straight line extending along a center axis of the tank.

20 Claims, 9 Drawing Sheets

FOREIGN PATENT DOCUMENTS

| | | |
|---|---|---|
| JP | 46-016849 | 5/1971 |
| JP | 49-150354 U | 12/1974 |
| JP | 53-159563 U | 5/1977 |
| JP | 56-024716 | 3/1981 |
| JP | 60-68518 A | 4/1985 |
| JP | 64-019639 | 1/1989 |
| JP | 03-297018 A | 12/1991 |
| JP | 9-320402 A | 12/1997 |
| JP | 10-321084 A | 12/1998 |
| JP | 10-334776 A | 12/1998 |
| JP | 11-224572 A | 8/1999 |
| JP | 2000-134730 A | 5/2000 |
| JP | 2000-350318 A | 12/2000 |
| JP | 2001-351481 A | 12/2001 |
| JP | 2002-42614 A | 2/2002 |
| JP | 2002-110007 A | 4/2002 |

OTHER PUBLICATIONS

Official Action mailed Feb. 17, 2012, in U.S. Appl. No. 12/774,427, 12 pages, U.S. Patent and Trademark Office, Alexandria, VA.
International Search Report (PCT/ISA/210) dated Feb. 12, 2008.
Written Opinion (PCT/ISA/237) dated Feb. 12, 2008.
Office Action dated Apr. 19, 2011, issued in the corresponding Japanese Patent Application No. 2010-049664, and an English Translation thereof.
Office Action (Notice of Rejection) from Japanese Patent Office issued in Japanese Patent Application No. 2010-049664 dated Sep. 13, 2011, with an English translation thereof.

SWITCH

TECHNICAL FIELD

The present invention relates to a switch such as a gas-insulated switchgear, and, more particularly to a switch having a blade-type moving contact and a fixed contact both accommodated in a tank of the switch, in which the blade-type moving contact extends in a radial direction from a turning center and reciprocates such that a free end of the blade-type moving contact draws a turning locus, and the fixed contact comes into contact with and separates from the moving contact within a turning range of the moving contact.

BACKGROUND ART

There has been proposed a structure of a switch having such a blade-type moving contact in which the blade-type moving contact extends from a turning center in a radial direction in a tank, reciprocates such that its free end draws a turning locus, and a fixed contact that comes into contact with and separates from the moving contact is arranged in a turning range of the moving contact. This structure has advantages such that positions of the moving contact and the fixed contact can be freely set, the flexibility of arrangement is enhanced, and thus this structure can be applied to switches having various positional relations (see, for example, Patent Documents 1 and 2).

Patent Document 1: Japanese Patent Application Laid-open No. S60-68518
Patent Document 2: Japanese Patent Application Laid-open No. 2002-110007

DISCLOSURE OF INVENTION

Problem to be Solved by the Invention

However, in the switch shown in Patent Document 1, a movable-side support conductor that supports a moving contact and a fixed-side support conductor that supports a fixed contact extend along a center axis in a tank, and the movable-side support conductor and the fixed-side support conductor are arranged in parallel to and spaced from each other. It is necessary to secure a predetermined ground distance (insulation distance) between the movable-side support conductor and a tank wall surface, a predetermined ground distance between the fixed-side support conductor and the tank wall surface, and also a predetermined electrode distance between the movable-side support conductor and the fixed-side support conductor. Therefore, the size of the tank is naturally enlarged and thus an improvement has been desired. Furthermore, conventionally, appropriate ground distances of the movable-side support conductor and the fixed-side support conductor have not been studied, and because a tank diameter in terms of insulation design is determined by one of support conductors closer to the tank, an improvement has been desired.

Meanwhile, in a case of a switch as shown in Patent Document 2, in which a plurality of conduction members in contact with a moving contact are provided in a radial direction of a turning locus of a moving contact, an opening of a fixed contact extends in a radial direction of a turning locus, and if the number of conduction members is increased to increase the capacity of the switch, the fixed contact becomes longer in the radial direction of the turning locus. Therefore, the size of the tank is enlarged and thus an improvement has been desired.

The present invention has been achieved in view of the above problems, and an object of the present invention is to provide a switch capable of enhancing a capacity of the switch while preventing a diameter of a tank from increasing, in which the diameter of the tank can be minimized while keeping the same capacity of the tank, and an internal structure can be simplified.

Means for Solving Problem

In order to solve the aforementioned problems, a switch according to the present invention is constructed in such a manner as to include a blade-type moving contact that extends in a radial direction of a turning center and reciprocates such that a free end of the blade-type moving contact draws a turning locus, and a fixed contact that comes into contact with and separates from the moving contact, the blade-type moving contact and the fixed contact being accommodated in a tank, wherein the moving contact is supported by a movable-side support conductor, the fixed contact is supported by a fixed-side support conductor, the fixed contact has an opening through which the moving contact enters, the opening being opposed to the turning center of the moving contact, and the movable-side support conductor and the fixed-side support conductor are arranged substantially on a same straight line extending along a tank center axis.

Effect of the Invention

According to the present invention, the opening into which the moving contact enters is arranged to be opposed to the turning center of the moving contact. Therefore, even if the number of the conduction members of the fixed contact is increased and a width of the opening is increased, it is unnecessary to extend the moving contact in a radial direction of the turning locus. Accordingly, an increase in diameter of the tank is avoided and it is easy to increase the capacity thereof.

Furthermore, the movable-side support conductor and the fixed-side support conductor are arranged on a same straight line extending along a center axis of the tank. With this configuration, a ground distance (insulation distance) between the movable-side support conductor and the tank and that between the fixed-side support conductor and the tank can be made equal to each other, and the diameter of the tank can be minimized while keeping a predetermined capacity of the tank.

EXPLANATIONS OF LETTERS OR NUMERALS

Figure 1:
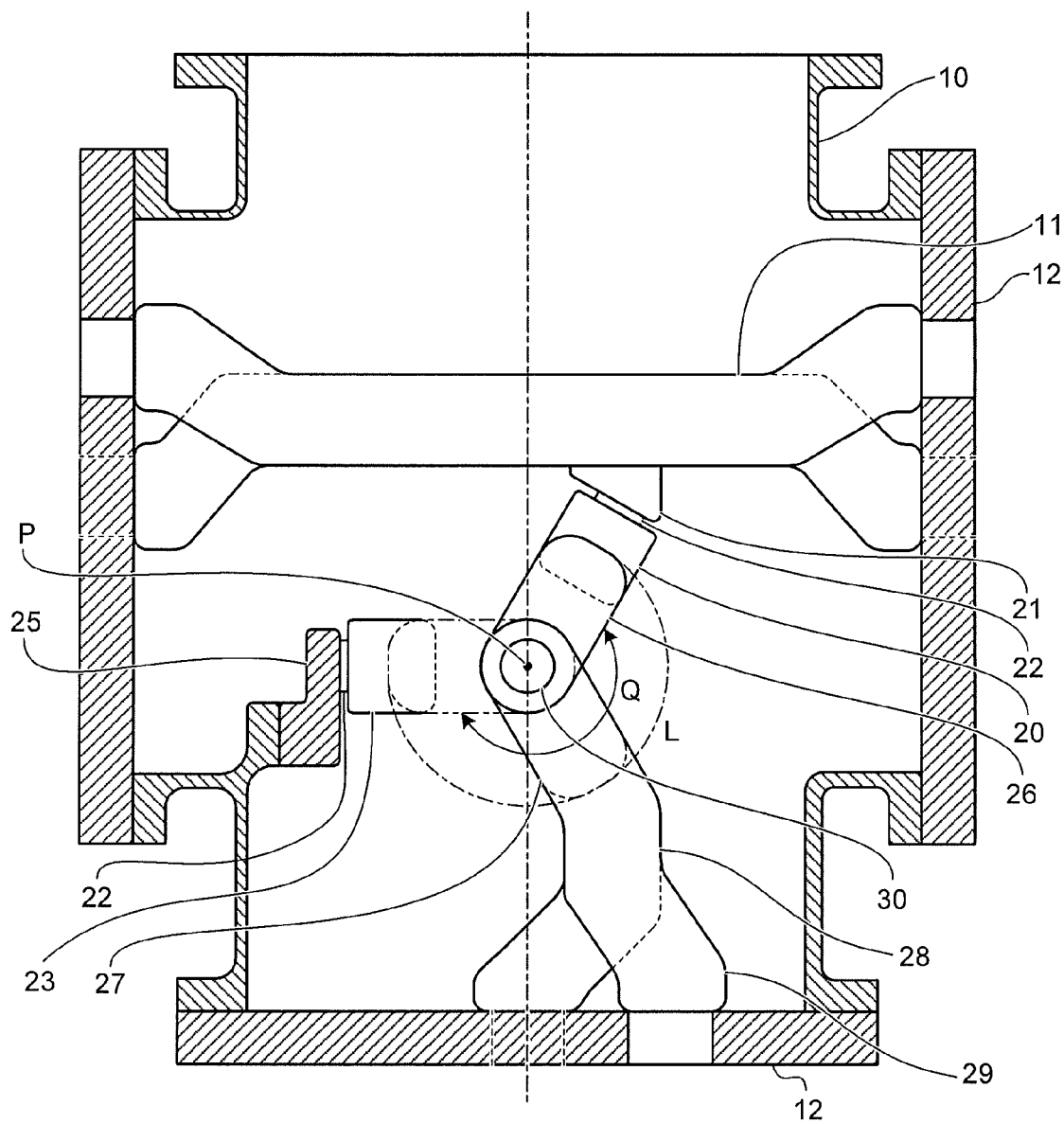
FIG. 1 is a sectional view taken along a plane extending along a main bus of a switch according to a first embodiment of the present invention.

10 Tank
11 Main bus
12 Insulation spacer
20 Fixed contact
20a Opening
21 Fixed-side support conductor
22 Connecting conductor
22a Protrusion
23 Grounding fixed contact
25 Grounding fixed-side support conductor
26 Moving contact
26a Free end
27 Slit conductor
28 Movable-side support conductor
29 Spacer support conductor
30 Insulation operating shaft (rotation shaft)
31 Conduction member
33 Support frame
35 Support rod
37 Fastening member
41 Retaining member
43 Leaf spring
45 Outer frame

BEST MODE(S) FOR CARRYING OUT THE INVENTION

Exemplary embodiments of a switch according to the present invention will be explained below in detail with reference to the accompanying drawings. The present invention is not limited to the embodiments.

First Embodiment

Figure 2:
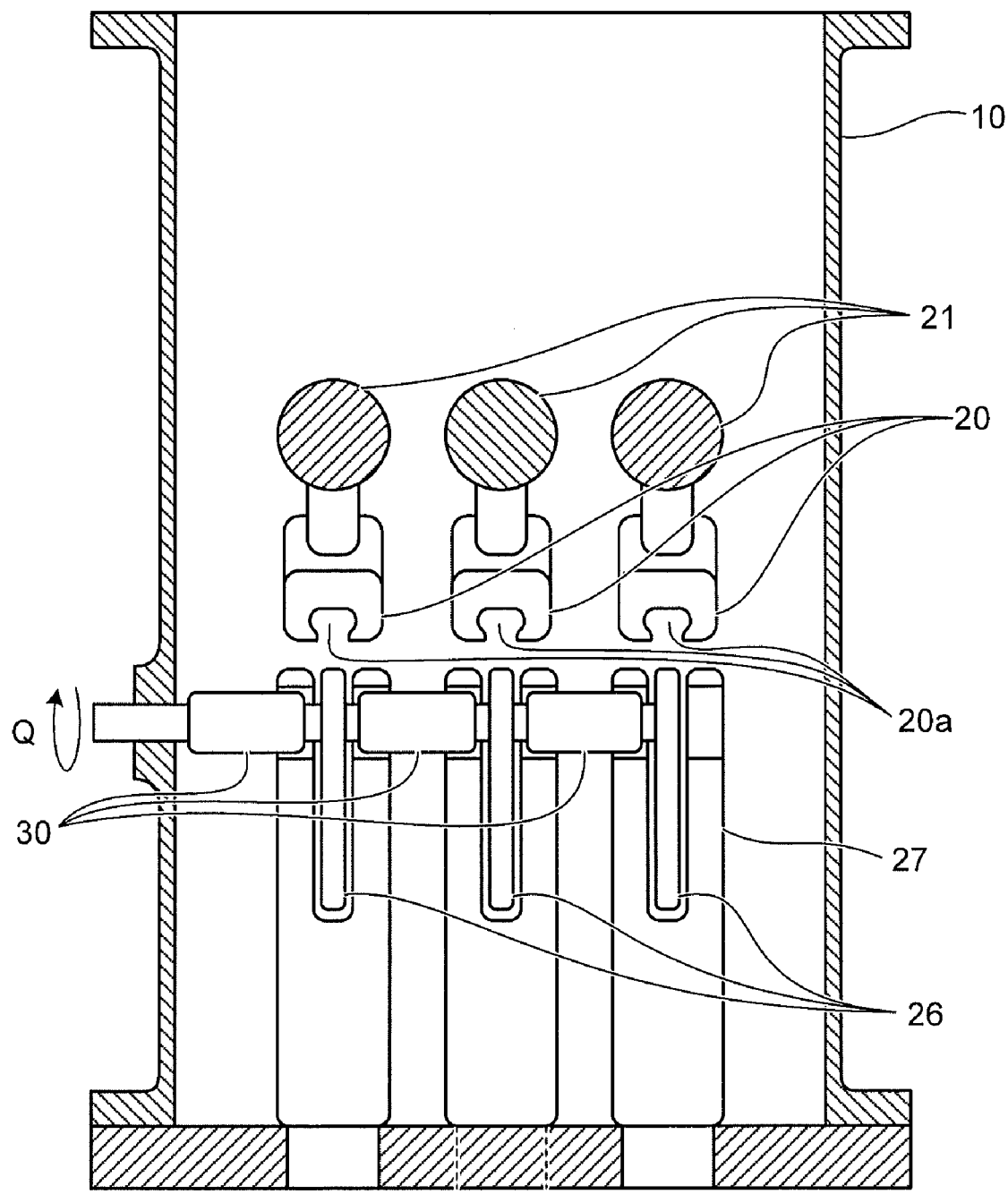
FIG. 2 is a sectional view taken along a plane extending along an insulation operating shaft of the switch according to the first embodiment of the present invention.

FIG. 1 is a sectional view taken along a plane extending along a main bus of a switch according to a first embodiment of the present invention. FIG. 2 is a sectional view taken along a plane extending along an insulation operating shaft of the switch. A tank 10 has an opening that is in communication with another tank, the opening is partitioned by an insulation spacer 12 and a hermetical space is formed in the tank 10. The hermetical space is filled with insulation gas such as sulfur hexafluoride gas. A three-phase main bus 11 extending in a horizontal direction is accommodated in the tank 10. A fixed contact 20 is arranged in each phase of the main bus 11 through a fixed-side support conductor 21 and a connecting conductor 22. Three grounding fixed contacts 23 are arranged at different positions in the tank 10 through a grounding fixed-side support conductor 25 and the connecting conductor 22.

Three movable-side support conductors 28 supported by a spacer connecting conductor 29 from the insulation spacer 12 extend toward a center of the tank 10 at further different positions in the tank 10. As clearly shown in FIG. 2, a tip end of each of the movable-side support conductors 28 is formed with a slit and is formed into a bifurcated slit conductor 27. Insulation operating shafts 30 are arranged in the slit conductors 27 to collectively penetrate three slit conductors 27. Each of the insulation operating shafts 30 is rotatably supported in a state that the insulation operating shaft 30 is insulated from the slit conductor 27 by an insulator that surrounds the insulation operating shaft 30 itself.

Blade-type (plate-like) moving contacts 26 are pivotally supported by the insulation operating shafts 30 and provided on the slit conductors 27. Each of the moving contact 26 is formed into a substantially thin long plate shape extending in the radial direction from the turning center, and the moving contact 26 turns around the turning center of the insulation operating shaft 30 such that a free end of the moving contact 26 draws a rotation locus L. A tip end free end 26a comes into contact with the fixed contact 20 or the grounding fixed contact 23. As clearly shown in FIG. 1, each moving contact 26 turns around a fully opened position accommodated in the slit as shown with the arrow Q in the drawing, and reciprocates between a fully closed position where the moving contact 26 comes into contact with the fixed contact 20 and a grounding position where the moving contact 26 comes into contact with the grounding fixed contact 23. The fixed contact 20 is arranged on one end side of the turning range of the moving contact 26, and the grounding fixed contact 23 is arranged on the other end side of the turning range. A rotation angle extending from the slit conductor 27 to the fixed contact 20 and a rotation angle extending from the slit conductor 27 to the grounding fixed contact 23 are the same.

Each of the fixed contact 20 and the grounding fixed contact 23 has a substantially U-shaped cross section formed with an opening 20a through which the moving contact 26 enters. The opening 20a is formed toward the insulation operating shaft 30. The fixed contact 20 and the grounding fixed contact 23 have substantially the same structures, and the structure of the fixed contact 20 is mainly described below.

Figure 3:
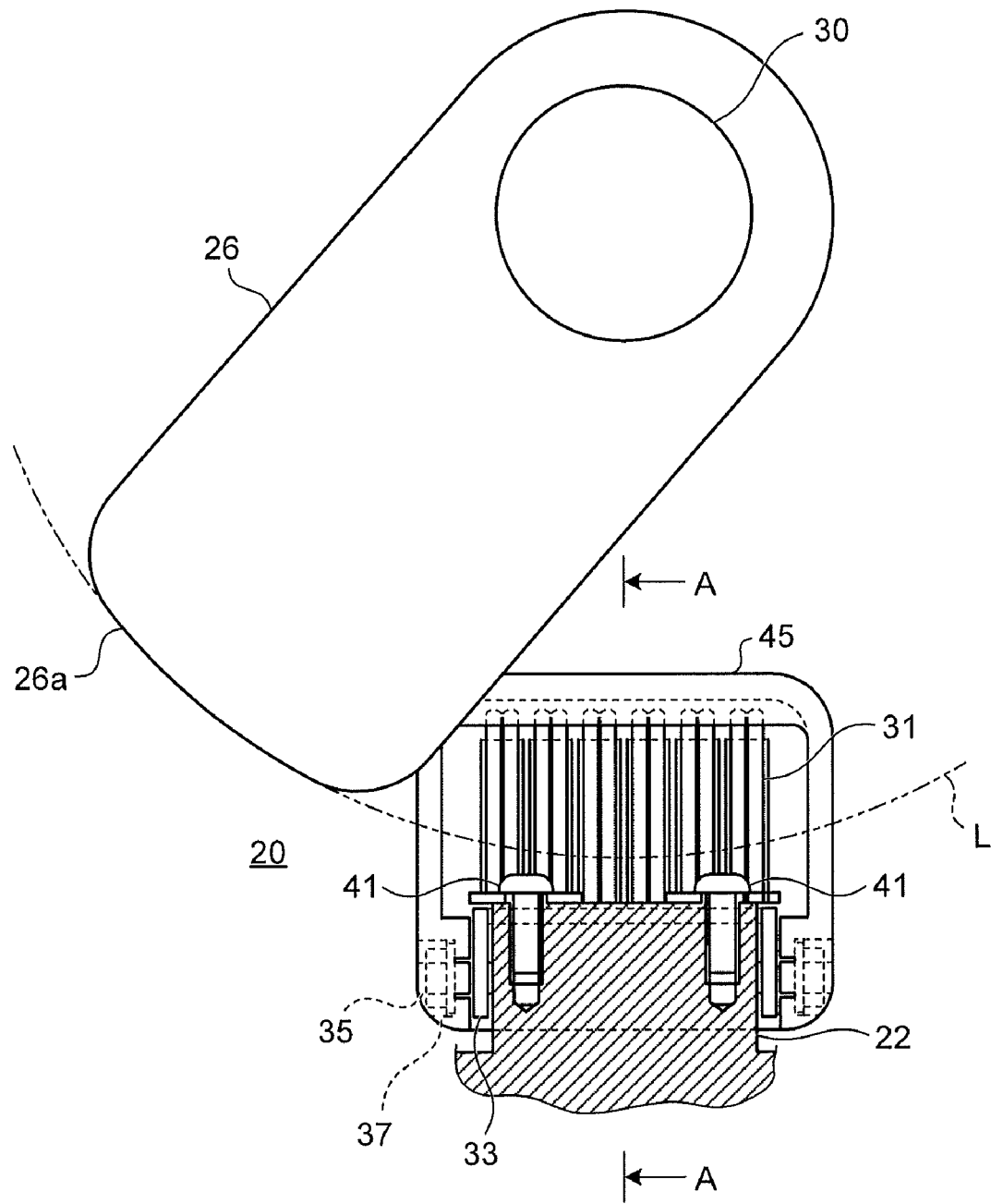
FIG. 3 is a sectional view of a fixed contact on a plane including a rotation locus of a free end of a moving contact.
Figure 4:
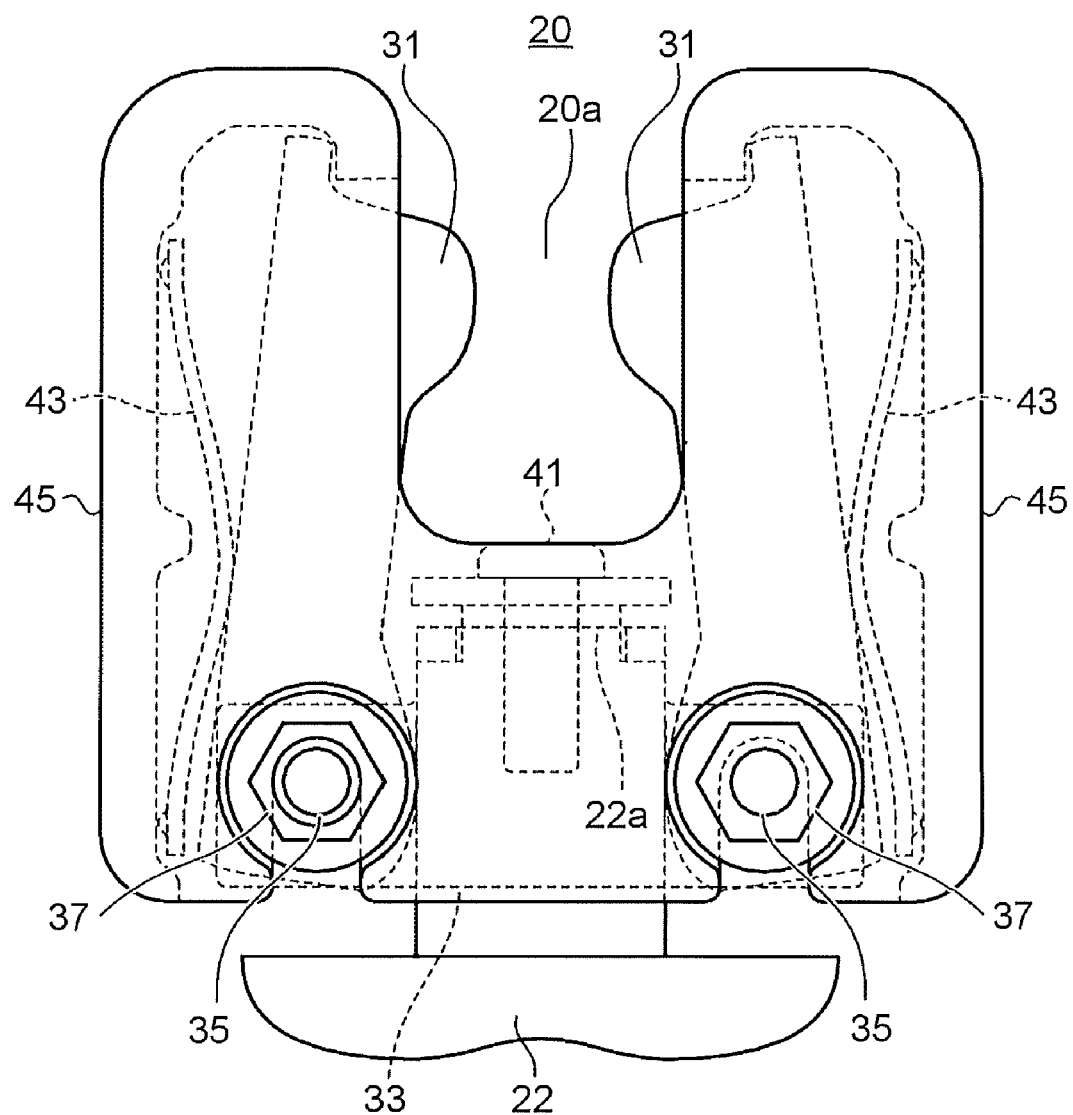
FIG. 4 is a side view of the fixed contact shown in FIG. 3.

FIG. 3 is a sectional view of the fixed contact on a plane including a rotation locus of the free end of the moving contact. FIG. 4 is a side view of the fixed contact shown in FIG. 3. The fixed contact 20 includes six pairs of conduction members 31 opposed to and substantially in parallel to each other such that tip ends of the conduction members 31 are directed to the opening 20a, a support frame 33 that tiltably supports a base of the conduction member 31, a leaf spring 43 that biases in such a direction that tip ends of the conduction members 31 approach each other, and an outer frame 45 that covers peripheries of the conduction member 31, the support frame 33 and the leaf spring 43 and shields them from an outside electric field.

The six pairs of the conduction members 31 are provided such that each pair of the conduction members 31 forming is arranged in a shape of "/\", which is just like an "inverted V", and such six pairs each arranged in the shape of "inverted V" are spaced from one another at a predetermined distance in a direction of the rotation locus L of the moving contact 26. That is, twelve conduction members 31 are arranged in two rows six each such that their main surfaces are extending in parallel to each other. Each set of the six conduction members 31 forming each row is collectively supported by a support rod 35 inserted through a through hole formed in bases thereof. The support rod 35 is loosely fitted into the through holes of the conduction members 31 and fastened to the support frame 33 by a fastening member 37. With this structure, the conduction members 31 are tiltably supported and the width of a separating distance (opening width) between tip ends of the conduction members 31 is varied.

The outer frame 45 has high flexibility in shape, the outer frame 45 is formed by casting that is effective for shielding the electric field. The outer frame 45 constitutes a shell of the fixed contact 20. The outer frame 45 is formed into a substantially box-like shape covering peripheries of the conduction member 31, the support frame 33 and the leaf spring 43. The opening 20a into which the blade-type moving contact 26 enters is formed in the mutually opposed and substantially parallel conduction members 31 at a location corresponding to a distance between tip ends of the conduction members 31. Two sets of retaining members 41 including a screw and a washer are inserted from the opening 20a of the outer frame 45, and they are fastened to a protrusion 22a of the connecting conductor 22.

As clearly shown in FIG. 3, the free end 26a of the moving contact 26 has a shape configured along the turning locus L of the moving contact 26. By employing such a shape, an electric field of the free end 26a when the moving contact 26 turns in a voltage applying state can be relaxed without increasing a turning range. A rectangular free end 26a is not preferable because an electric field concentrates on angle portions thereof.

Second Embodiment

Figure 5:
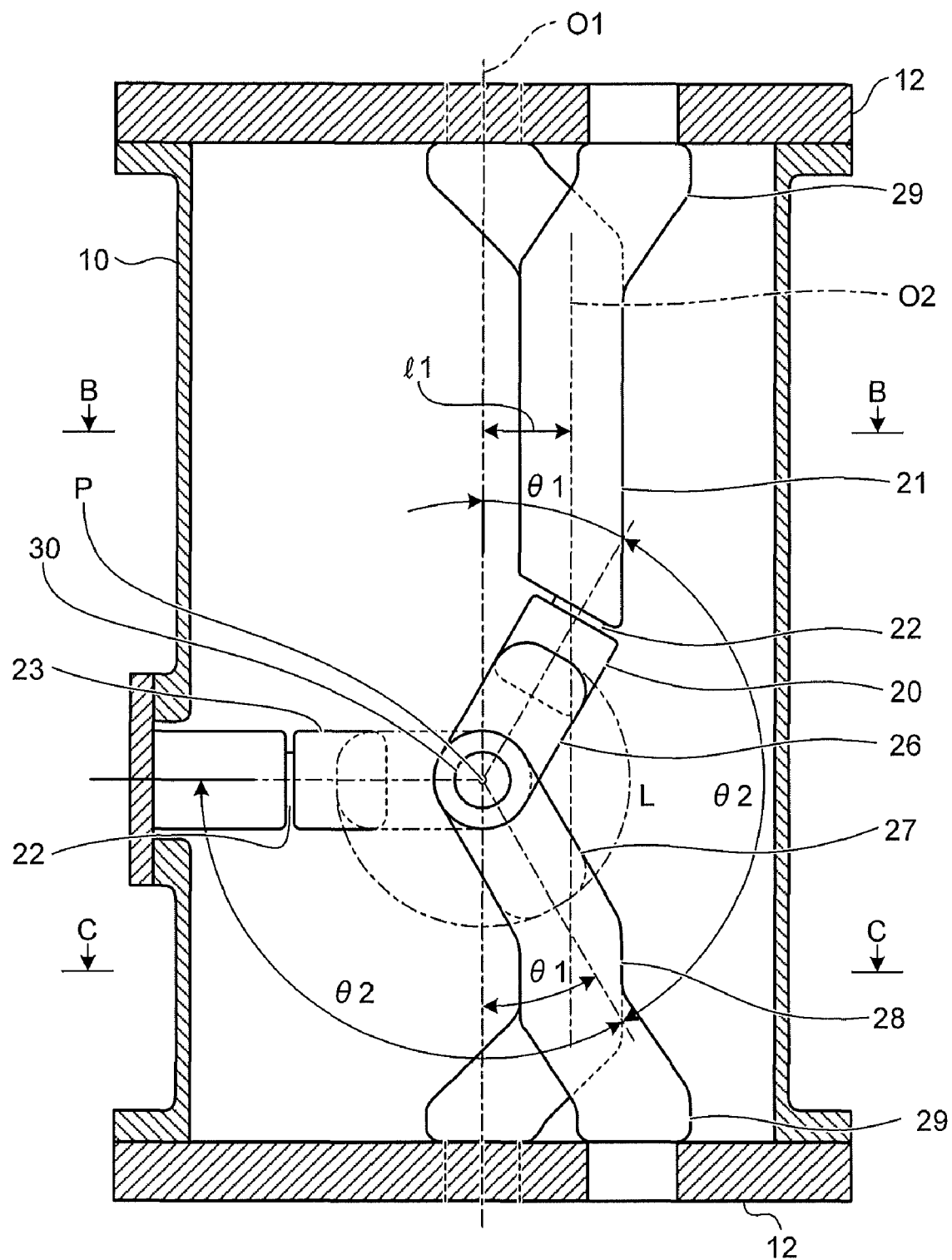
FIG. 5 is a vertical sectional view of a switch according to a second embodiment of the present invention.
Figure 6:
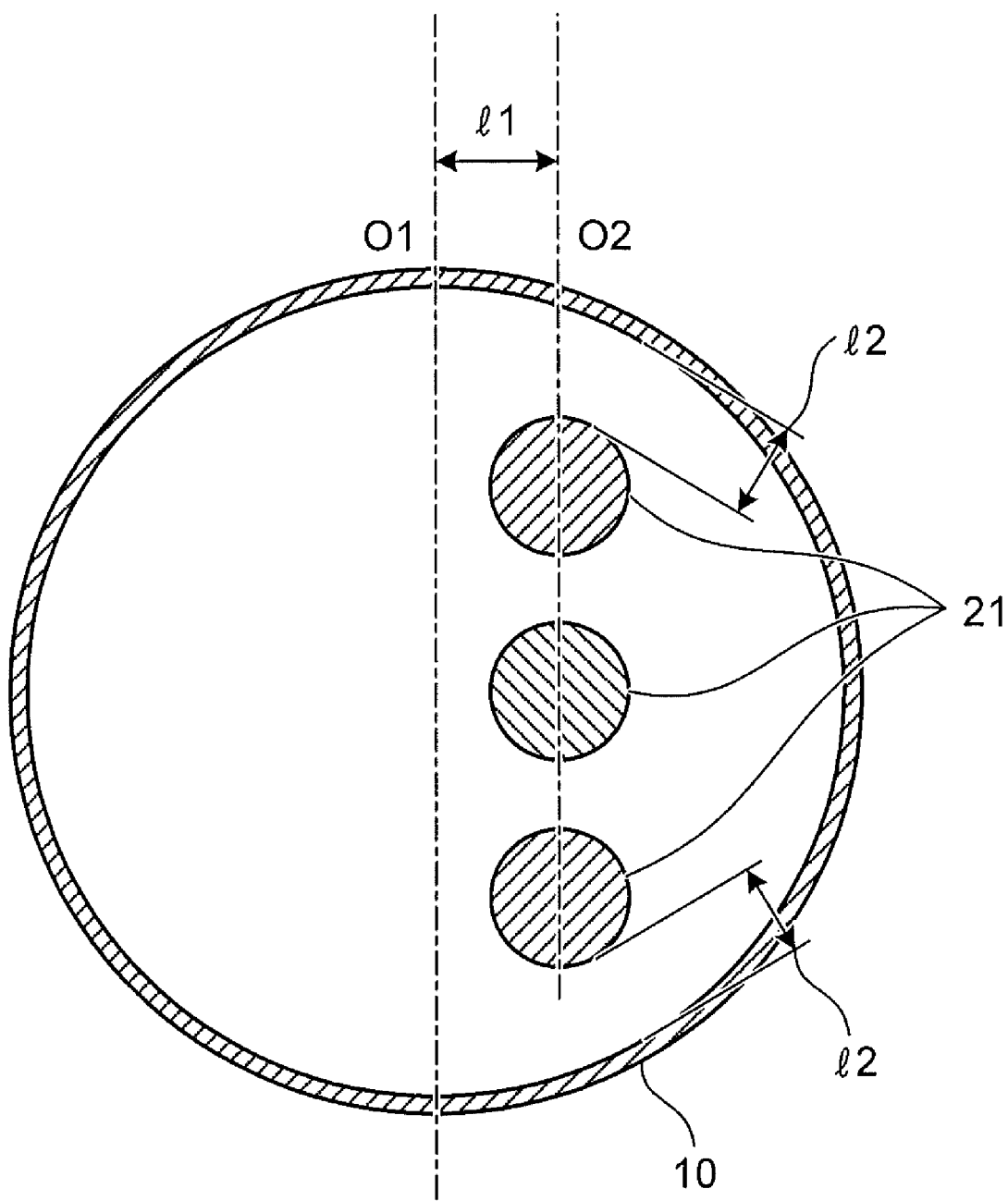
FIG. 6 is an arrow sectional view taken along a line B-B in FIG. 5, as well as an arrow sectional view taken along a line C-C in FIG. 5.
Figure 7:
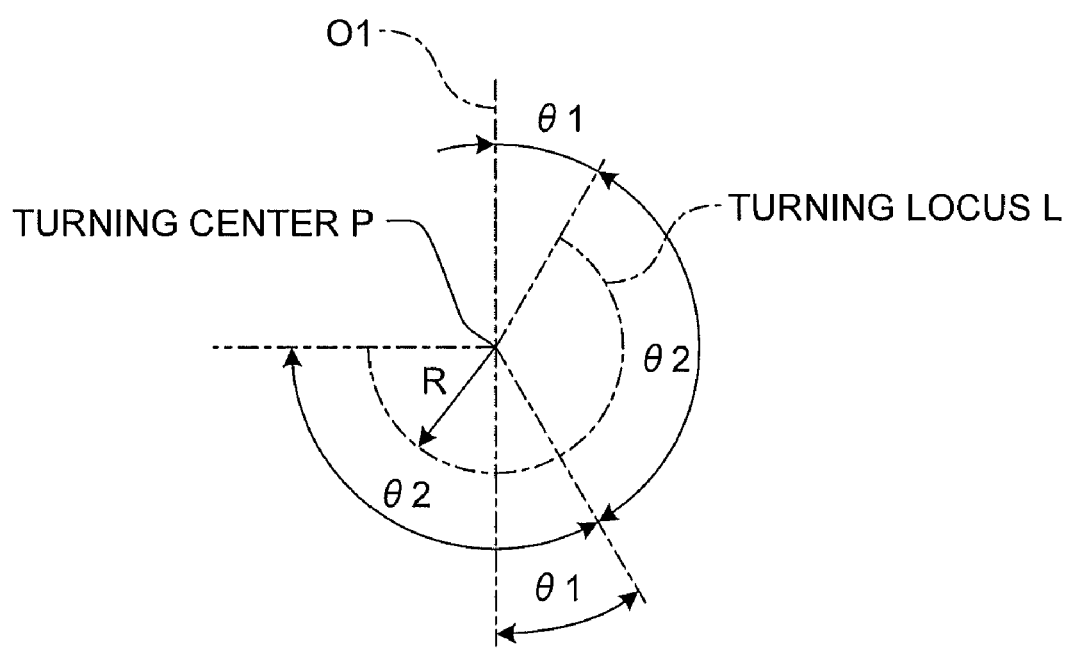
FIG. 7 is an explanatory diagram of angles of a moving contact at each position of a fully opened position, a fully closed position, and a grounding position.

FIG. 5 is a vertical sectional view of a second embodiment of the switch of the invention. FIG. 6 is an arrow sectional view taken along a line B-B in FIG. 5, as well as an arrow sectional view taken along a line C-C in FIG. 5. FIG. 7 is an explanatory diagram of angles of the moving contact at each position of a fully opened position, a fully closed position, and a grounding position.

In FIG. 5, the tank 10 is formed into a substantially cylindrical shape, its opening that is in communication with another tank is partitioned by the insulation spacer 12, and a hermetical space is formed in the tank 10. The hermetical space is filled with insulation gas such as sulfur hexafluoride gas. Three fixed contacts 20 corresponding to three phase main circuit conductors (not shown) are arranged in the tank 10 substantially in parallel to each other. The fixed contacts 20 are arranged, through the connecting conductors 22 on tip ends of three fixed-side support conductors 21 extending along an axis of the tank 10 from the spacer connecting conductor 29 supported by the insulation spacer 12 provided on one end (an upper portion in FIG. 5) of the tank 10. Further, the three grounding fixed contacts 23 are arranged at other positions in the tank 10 substantially in parallel to each other through the grounding fixed-side support conductor 25 and the connecting conductor 22.

The three movable-side support conductors 28 supported by the insulation spacer 12 of the other end (a lower portion in FIG. 5) of the tank 10 at the spacer connecting conductor 29 extend along the axis of the tank 10 at other positions in the tank 10, and then the movable-side support conductors 28 bend toward a center portion. A tip end of each of the three movable-side support conductors 28 is formed with a slit and formed into the bifurcated slit conductor 27. The insulation operating shaft 30 is arranged in the slit conductor 27 to collectively penetrate the three slit conductors 27. Each of the insulation operating shafts 30 is rotatably supported in a state that the insulation operating shaft 30 is insulated from the slit conductor 27 by an insulator that surrounds the insulation operating shaft 30.

Similarly to the first embodiment, each of the fixed contact 20 and the grounding fixed contact 23 has a substantially U-shaped cross section formed with an opening through which the moving contact 26 enters. These openings are oriented toward the insulation operating shaft 30.

As described above, FIG. 6 is an arrow sectional view taken along the line B-B in FIG. 5, as well as an arrow sectional view taken along the line C-C in FIG. 5. That is, the three movable-side support conductors 28 and the three fixed-side support conductors 21 have substantially the same diameters, and they are arranged on a same straight line O2. As shown in FIG. 5 and FIG. 6, the movable-side support conductor 28 and the fixed-side support conductor 21 of the present embodiment are arranged on a plane O2 that is in parallel to and separated from a plane O1 including a center axis of the tank by a distance l1. A distance from the movable-side support conductor 28 and the fixed-side support conductor 21, which are both on the sides closer to an inner wall surface of the tank 10, to the inner wall surface, is l2.

According to the switch of the present embodiment, the fixed contact 20 is supported by the fixed-side support conductor 21, and the opening through which the moving contact 26 enters is formed to be opposed to the turning center of the moving contact 26. The movable-side support conductor 28 and the fixed-side support conductor 21 are arranged substantially on the same straight line extending along the center axis of the tank. Because the opening of the fixed contact 20 through which the moving contact 26 enters is opposed to the turning center of the moving contact 26, even if the number of the conduction members 31 is increased and the width of the opening is increased, it is unnecessary to extend the moving contact 26 in the radial direction of the turning locus, the diameter of the tank is prevented from increasing, and a capacity of the tank can be increased easily. Because the movable-side support conductor 28 and the fixed-side support conductor 21 are arranged substantially on the same straight line extending along the center axis of the tank, a ground distance (insulation distance) between the movable-side support conductor 28 and the tank and a ground distance (insulation distance) between the fixed-side support conductor 21 and the tank can be made equal to each other, and the diameter of the tank 10 can be minimized while keeping the predetermined capacity.

As shown in FIG. 5 and FIG. 7, an angle $\theta 1$ formed between the center axis of the tank and the moving contact 26 in its fully opened position accommodated in the slit conductor 27, and an angle $\theta 1$ formed between the center axis of the tank and the moving contact 26 in the fully closed position that is in contact with the fixed contact 20 are equal to each other. With this configuration, a relation of position where the movable-side support conductor 28 and the fixed-side support conductor 21 are in contact with the moving contact 26 or the slit conductor 27 can be made simple, and the structure is simplified.

Furthermore, the fixed contact 20 is arranged on one end side of the turning range of the moving contact 26, the grounding fixed contact 23 is arranged on the other end side of the turning range, and the turning center of the moving contact 26 is on the center axis of the tank. With this structure, a ground insulation distance of the free end 26a of the moving contact 26 is equal both on the side of the fixed contact 20 and on the side of the grounding fixed contact 23, and the diameter of the tank 10 is reduced.

Further, in the switch according to the present embodiment, an angle formed between the moving contact 26 in a fully opened position and the moving contact 26 in a fully closed position, and an angle formed between the moving contact 26 in the fully opened position and the moving contact 26 in the grounding position are $\theta 2$ (120°). By making the rotation angles equal to each other, the structure of the operating device and a connecting system are standardized in design. By making the rotation angles equal to each other, insulation designs between poles (between electrodes with respect to the slit conductor 27) on the side of the fixed contact 20 and on the side of the grounding fixed contact 23 can be coordinated with each other. That is, it is possible to prevent an electric field from concentrating on one of sides unevenly. Further, because the grounding fixed contact 23 intersects with the center axis of the tank at right angles, the grounding fixed contact 23 can be mounted at a location closest to the tank 10. Because the turning center of the moving contact 26 and the ground distance of the turning locus are coordinated with each other, the diameter of the tank 10 can be reduced.

The switch according to the present embodiment is effective when it is applied to a non-segregated three phase switch; however, a predetermined effect can be achieved even when the switch according to the present embodiment is applied to a phase-separation (single phase) switch.

Third Embodiment

Figure 8:
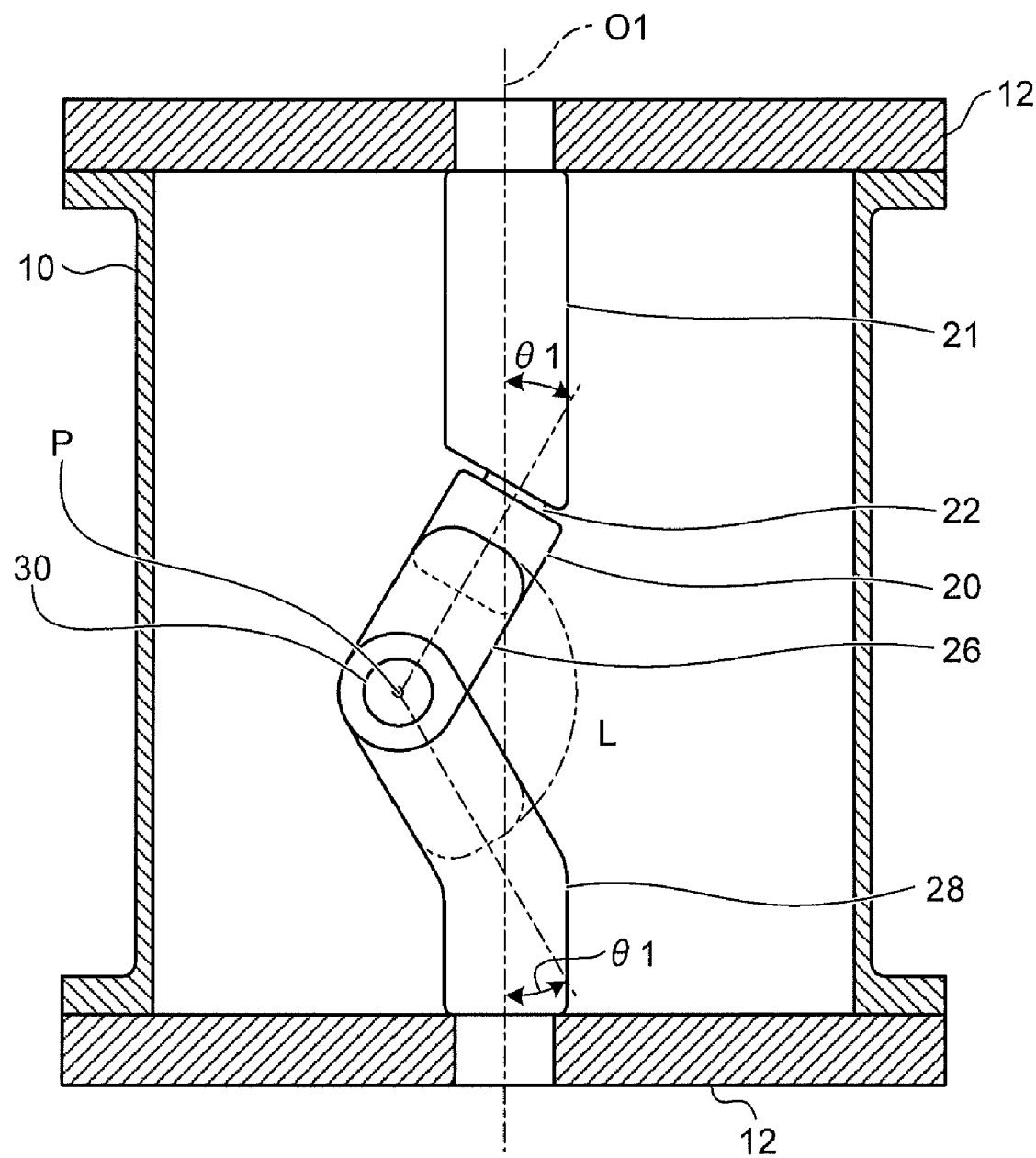
FIG. 8 is a vertical sectional view of a switch according to a third embodiment of the present invention.
Figure 9:
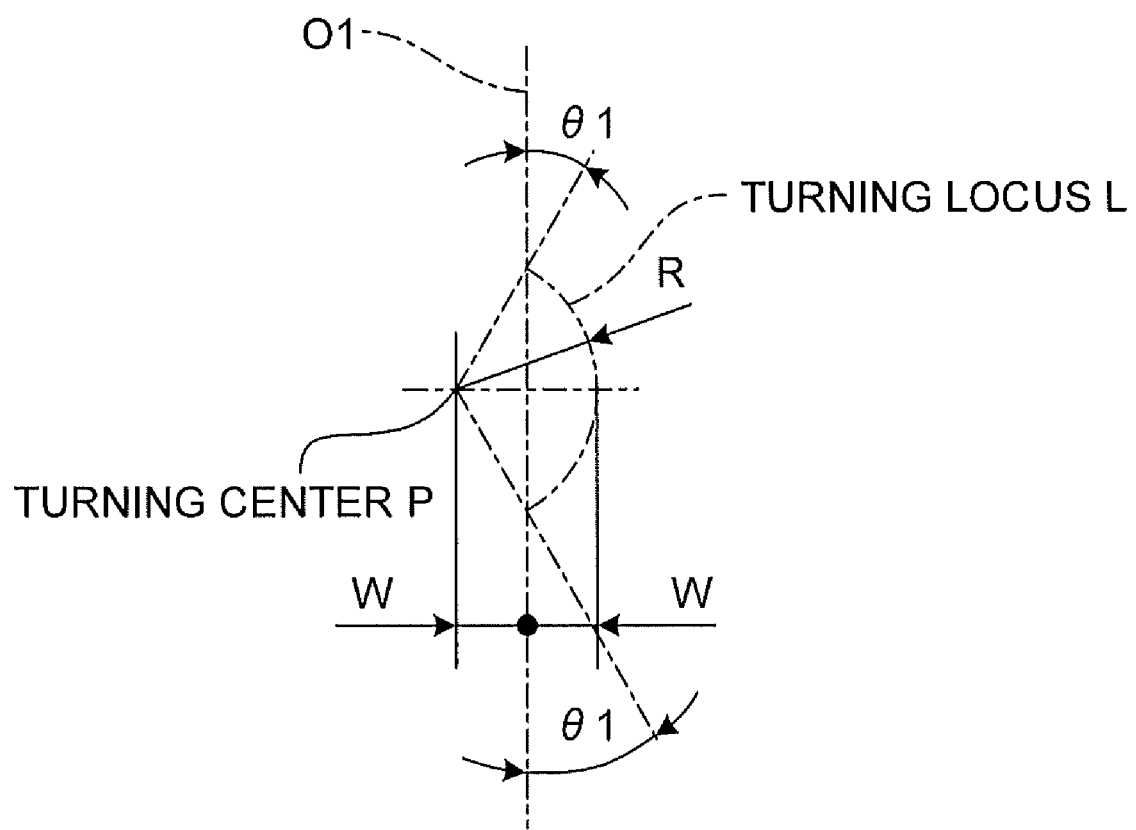
FIG. 9 is an explanatory diagram of an angle of a moving contact at each position of a fully opened position and a fully closed position.

FIG. 8 is a vertical sectional view of a switch according to a third embodiment of the present invention. FIG. 9 is an explanatory diagram of an angle of each position of the moving contact at a fully opened position and a fully closed position. The switch according to the present embodiment is a single phase switch, that is, a phase-separation switch; however, the switch according to the present embodiment can be applied as a non-segregated three phase switch. One moving contact 26 and one fixed contact 20 are accommodated in the tank 10. In the present embodiment, the movable-side support conductor 28 and the fixed-side support conductor 21 are arranged substantially on the center axis of the tank 10.

Both a distance between a position furthest from the tank center axis of the turning locus L and the tank center axis, and a distance between the turning center P of the turning locus L and the tank center axis are both W (half of a radius R of the turning locus L), and an angle formed between the moving contact 26 in the fully opened position and the moving contact 26 in the fully closed position is 120°.

In the present embodiment, with the above-described structure, in the phase-separation switch, the movable-side support conductor 28 and the fixed-side support conductor 21 extending from the insulation spacer 12 extend straightly. With this configuration, a structure in the tank 10 is simplified. The ground distance on the side of the free end 26a of the moving contact 26 and the ground distance on the side of the turning center P are substantially equal to each other. With this configuration, the diameter of the tank 10 is reduced. Further, making the rotation angle 120°, the rotation angle can be coordinated with that of the switch according to the second embodiment in which the grounding fixed contact 23 is arranged on the other end side of the turning range of the moving contact 26, so that the mechanism of the operating device and the connecting system are further standardized in design.

INDUSTRIAL APPLICABILITY

The switch according to the present invention is effective when it is applied to a switch including a blade-type moving contact that is rotatably and pivotally supported and that reciprocates such that its free end draws a rotation locus, and a fixed contact including a conduction member with which the moving contact comes into contact.

The invention claimed is:

1. A switch comprising a blade-type moving contact that extends in a radial direction of a turning center and reciprocates such that a free end of the blade-type moving contact draws a turning locus, and a fixed contact that comes into contact with and separates from the moving contact, the blade-type moving contact and the fixed contact being accommodated in a tank, wherein the moving contact is supported by a movable-side support conductor, the fixed contact is supported by a fixed-side support conductor, the fixed contact has an opening through which the moving contact enters, the opening being opposed to the turning center of the moving contact, and an angle formed between a tank center axis and the moving contact located in a fully open position accommodated in a slit conductor, and an angle formed between the tank center axis and the moving contact located in a fully closed position where the moving contact comes into contact with the fixed contact are substantially equal to each other.

2. The switch according to claim 1, wherein the movable-side support conductor and the fixed-side support conductor are arranged substantially on a same straight line extending along the tank center axis.

3. The switch according to claim 2, wherein the fixed contact includes a plurality of conduction members that come into contact with the moving contact, the conduction members being arranged in a direction of the turning locus of the moving contact.

4. The switch according to claim 2, wherein the moving contact is accommodated in the slit conductor in the fully opened position.

5. The switch according to claim 2, wherein the movable-side support conductor and the fixed-side support conductor are located substantially on the tank center axis.

6. The switch according to claim 2, wherein the fixed contact is arranged on one end side of a turning range of the moving contact, a grounding fixed contact is arranged on the other end side of the turning range, and a turning center of the moving contact is on the tank center axis.

7. The switch according to claim 2, wherein an angle formed between the moving contact located in the fully opened position and the moving contact located in the fully closed position is 120°, or an angle formed between the moving contact located in the fully opened position and the moving contact located in a grounding position is 120°.

8. The switch according to claim 2, wherein a free end of the moving contact has a shape extending along the turning locus of the moving contact.

9. The switch according to claim 1, wherein the fixed contact includes a plurality of conduction members that come into contact with the moving contact, the conduction members being arranged in a direction of the turning locus of the moving contact.

10. The switch according to claim 1, wherein the moving contact is accommodated in the slit conductor in the fully opened position.

11. The switch according to claim 10, wherein the movable-side support conductor and the fixed-side support conductor are located substantially on the tank center axis.

12. The switch according to claim 10, wherein the fixed contact is arranged on one end side of a turning range of the moving contact, a grounding fixed contact is arranged on the other end side of the turning range, and a turning center of the moving contact is on the tank center axis.

13. The switch according to claim 10, wherein an angle formed between the moving contact located in the fully opened position and the moving contact located in the fully closed position is 120°, or an angle formed between the moving contact located in the fully opened position and the moving contact located in a grounding position is 120°.

14. The switch according to claim 10, wherein a free end of the moving contact has a shape extending along the turning locus of the moving contact.

15. The switch according to claim 1, wherein the movable-side support conductor and the fixed-side support conductor are located substantially on the tank center axis.

16. The switch according to claim 15, wherein an angle formed between the moving contact located in the fully opened position and the moving contact located in the fully closed position is 120°, or an angle formed between the moving contact located in the fully opened position and the moving contact located in a grounding position is 120°.

17. The switch according to claim 1, wherein the fixed contact is arranged on one end side of a turning range of the moving contact, a grounding fixed contact is arranged on the other end side of the turning range, and a turning center of the moving contact is on the tank center axis.

18. The switch according to claim 17, wherein an angle formed between the moving contact located in the fully opened position and the moving contact located in the fully closed position is 120°, or an angle formed between the moving contact located in the fully opened position and the moving contact located in a grounding position is 120°.

19. The switch according to claim 1, wherein an angle formed between the moving contact located in the fully opened position and the moving contact located in the fully closed position is 120°, or an angle formed between the moving contact located in the fully opened position and the moving contact located in a grounding position is 120°.

20. The switch according to claim 1, wherein a free end of the moving contact has a shape extending along the turning locus of the moving contact.

\* \* \* \* \*